(12) United States Patent
Harris

(10) Patent No.: US 10,271,684 B1
(45) Date of Patent: Apr. 30, 2019

(54) ADJUSTABLE LID FOR BAKEWARE PAN

(71) Applicant: Columbia Insurance Company, Omaha, NE (US)

(72) Inventor: E. Mark Harris, McHenry, IL (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 213 days.

(21) Appl. No.: 15/220,051

(22) Filed: Jul. 26, 2016

Related U.S. Application Data

(60) Provisional application No. 62/199,064, filed on Jul. 30, 2015.

(51) Int. Cl.
*A47J 36/10* (2006.01)

(52) U.S. Cl.
CPC ..................... *A47J 36/10* (2013.01)

(58) Field of Classification Search
CPC ........... A47J 36/10; A47J 36/06; B65D 45/16; B65D 45/20; B65D 45/24
See application file for complete search history.

(56) References Cited

U.S. PATENT DOCUMENTS

| | | |
|---|---|---|
| 213,688 A | 3/1879 | Prindle |
| 1,361,141 A | 12/1920 | Conover |
| 1,859,228 A | 5/1932 | Berry |
| 2,631,750 A | 3/1953 | Laucks |
| 2,633,266 A | 3/1953 | Cookson |
| 3,477,609 A | 11/1969 | Winkler, Jr. |
| 3,589,551 A | 6/1971 | Haggbom |
| 3,792,797 A | 2/1974 | Mrusek et al. |
| 3,815,777 A | 6/1974 | Churan |
| 3,942,679 A | 3/1976 | Starr |
| 4,157,766 A | 6/1979 | Gerdes |
| 4,331,257 A | 5/1982 | Taschner |
| 4,728,003 A | 3/1988 | Davey |
| D297,875 S | 9/1988 | Carville |
| 4,989,747 A | 2/1991 | Demurger |
| 5,100,015 A | 3/1992 | Vanderstuyf |
| 5,169,018 A | 12/1992 | Fiore |
| D334,453 S | 3/1993 | Koloski |
| 5,193,707 A | 3/1993 | Mizumura |
| D339,471 S | 9/1993 | Maple et al. |
| D350,646 S | 9/1994 | Bescher et al. |
| 5,427,265 A | 6/1995 | Cautereels et al. |
| D368,161 S | 3/1996 | Miller |
| D368,162 S | 3/1996 | Miller |
| 5,573,130 A | 11/1996 | Chanal et al. |

(Continued)

*Primary Examiner* — Andrew T Kirsch
*Assistant Examiner* — Don M Anderson
(74) *Attorney, Agent, or Firm* — Thompson Coburn LLP

(57) ABSTRACT

A lid and adaptor assembly capable of being used with at least two food containers such as baking pans having different external dimensions. A pair of clasps are rotatably disposed on opposite side of the lid, each clasp capable of being rotated from an open position to a closed position. A pair of adaptors are provided for connection to the clasps in a first orientation and a second orientation, and each adaptor has a first surface capable of engaging a first food container when the adaptor is in the first orientation, and a second surface capable of engaging a second food container when the adaptor is in the second orientation. A pair of flexible fingers may also be used on the clasp to act as the adaptors to enable use with food containers having different external dimensions.

14 Claims, 17 Drawing Sheets

(56) References Cited

U.S. PATENT DOCUMENTS

| | | |
|---|---|---|
| D376,260 S | 12/1996 | Haley et al. |
| D377,865 S | 2/1997 | Kristoffersson |
| D378,025 S | 2/1997 | Perelli |
| 5,695,087 A | 12/1997 | Tutton et al. |
| 5,722,554 A | 3/1998 | Chanal et al. |
| D426,064 S | 6/2000 | Douglas et al. |
| D435,730 S | 1/2001 | Akre |
| D458,508 S | 6/2002 | Thonis et al. |
| 6,711,989 B1 | 3/2004 | Sarnoff |
| D489,530 S | 5/2004 | Lindsay |
| D499,931 S | 12/2004 | Kim |
| D500,227 S | 12/2004 | Seok |
| D516,376 S | 3/2006 | Kim |
| D528,357 S | 9/2006 | Hsu |
| D549,519 S | 8/2007 | Moon et al. |
| D558,513 S | 1/2008 | Scholze et al. |
| 7,854,344 B2 | 12/2010 | Suk |
| 8,083,088 B1 | 12/2011 | Thompson et al. |
| D653,450 S | 2/2012 | Walter |
| D662,766 S | 7/2012 | Smyers |
| 8,251,239 B2 | 8/2012 | Yeung |
| 8,286,819 B1 | 10/2012 | Morris, Jr. |
| D675,057 S | 1/2013 | Harvey et al. |
| D676,276 S | 2/2013 | Muspratt-Williams |
| 8,376,181 B2 | 2/2013 | Lundgreen et al. |
| D677,116 S | 3/2013 | Smyers et al. |
| D677,117 S | 3/2013 | Smyers et al. |
| D677,521 S | 3/2013 | Lindsay et al. |
| D682,609 S | 5/2013 | Lindsay et al. |
| 8,579,150 B2 | 11/2013 | Janny |
| 8,596,485 B2 | 12/2013 | Lindsay |
| D700,473 S | 3/2014 | Duvigneau |
| 8,678,212 B2 | 3/2014 | Kim |
| 8,678,230 B2 | 3/2014 | Smyers |
| 8,727,170 B2 | 5/2014 | Kim et al. |
| 8,733,550 B2 | 5/2014 | Harvey et al. |
| 8,800,803 B2 | 8/2014 | Stellwag |
| 8,870,021 B2 | 10/2014 | Smyers |
| D721,578 S | 1/2015 | Julius et al. |
| 8,944,272 B2 | 2/2015 | Chameroy et al. |
| 8,985,372 B2 | 3/2015 | Yang et al. |
| 2002/0179606 A1 | 12/2002 | Houk, Jr. et al. |
| 2004/0084464 A1 | 5/2004 | Koo |
| 2006/0249522 A1 | 11/2006 | Ringo |
| 2008/0105684 A1 | 5/2008 | Lindsay |
| 2009/0090719 A1 | 4/2009 | Jan et al. |
| 2009/0114653 A1 | 5/2009 | Schenker |
| 2009/0218360 A1 | 9/2009 | Suk |
| 2009/0223966 A1 | 9/2009 | Kidd et al. |
| 2011/0095022 A1 | 4/2011 | Yeung |
| 2012/0024855 A1 | 2/2012 | Smyers |
| 2012/0024856 A1 | 2/2012 | Smyers |
| 2012/0037654 A1 | 2/2012 | McNamara |
| 2012/0067903 A1 | 3/2012 | Chang |
| 2012/0168444 A1 | 7/2012 | Shitrit et al. |
| 2012/0187072 A1 | 7/2012 | Belle |
| 2012/0248116 A1 | 10/2012 | Smyers et al. |
| 2013/0000271 A1* | 1/2013 | Sonei ............ F02C 7/055 60/39.092 |
| 2013/0008905 A1* | 1/2013 | Chang ............ B65D 43/0202 220/324 |
| 2013/0092692 A1 | 4/2013 | Tejima et al. |
| 2013/0098920 A1 | 4/2013 | Lee |
| 2013/0175276 A1 | 7/2013 | Gleichauf et al. |
| 2013/0233854 A1 | 9/2013 | Smyers et al. |
| 2014/0042171 A1 | 2/2014 | Chameroy et al. |
| 2014/0217101 A1 | 8/2014 | Wang |
| 2014/0251998 A1 | 9/2014 | Kinskey et al. |
| 2014/0251999 A1 | 9/2014 | Ely et al. |
| 2014/0284840 A1 | 9/2014 | Smyers |
| 2014/0319147 A1 | 10/2014 | Horovitz et al. |
| 2015/0008224 A1 | 1/2015 | Friedland |
| 2015/0053683 A1 | 2/2015 | Becklin et al. |

* cited by examiner

ADJUSTABLE LID FOR BAKEWARE PAN

CROSS-REFERENCE

This application claims the benefit of U.S. Provisional Application Ser. No. 62/199,064, filed on Jul. 30, 2015. The disclosure of the prior application is incorporated herein by reference in its entirety.

BACKGROUND OF THE INVENTION

This invention relates to an adjustable lid that may be adapted for use with multiple bakeware pans of different sizes. A consumer may have different pans of various sizes and shapes, and if a lid is desired, each differently-sized pan requires a different lid. A kitchen can easily become cluttered with lids of many different sizes, all of which can only be paired with one specific corresponding pan. A universal pan lid that can fit multiple bakeware pans of different sizes would be functional and simplify use and storage issues.

SUMMARY OF INVENTION

The adjustable lid for bakeware pans disclosed herein includes a pan lid that may be used on multiple different pans that may be nominally the same size (e.g. 9"×13") but have overall different sizes due to different sized lips, edges, or handles. In a preferred embodiment, the bakeware pan is a metal pan. In one embodiment, this is accomplished by use of a removable, reversible adaptor that is attachable to the pan lid. The adaptor is reversible such that when the adaptor is in a first position, the lid is usable with a first bakeware pan and when the adaptor is in a second position, the lid is usable with a second, bakeware pan having somewhat different external dimensions, and the adaptor assists in retaining the lid to the pan in at least one of the positions.

In a further embodiment, the lid may include a member having flexible fingers or similar structure that collapse out of the way when not needed, for pans of a certain size, and may project downwardly to provide additional support for the lid when used with a pan of a narrower size, to prevent the lid from being inadvertently removed from the pan.

Note that while this disclosure may refer to bakeware pans, it should be understood that the uses of the lid and other structure of the disclosure are not so limited, and the term "pan" should be construed broadly. It will also be understood that the lids of the present disclosure are not necessarily intended to provide an airtight seal with the pan or container at issue; rather, these exemplary lids are intended for use in transporting food items without having to remove the food from the pan in which it was prepared. It should be appreciated, however, that in certain alternative embodiments, the lids of the present disclosure may be designed to provide an airtight seal with the pan or container.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
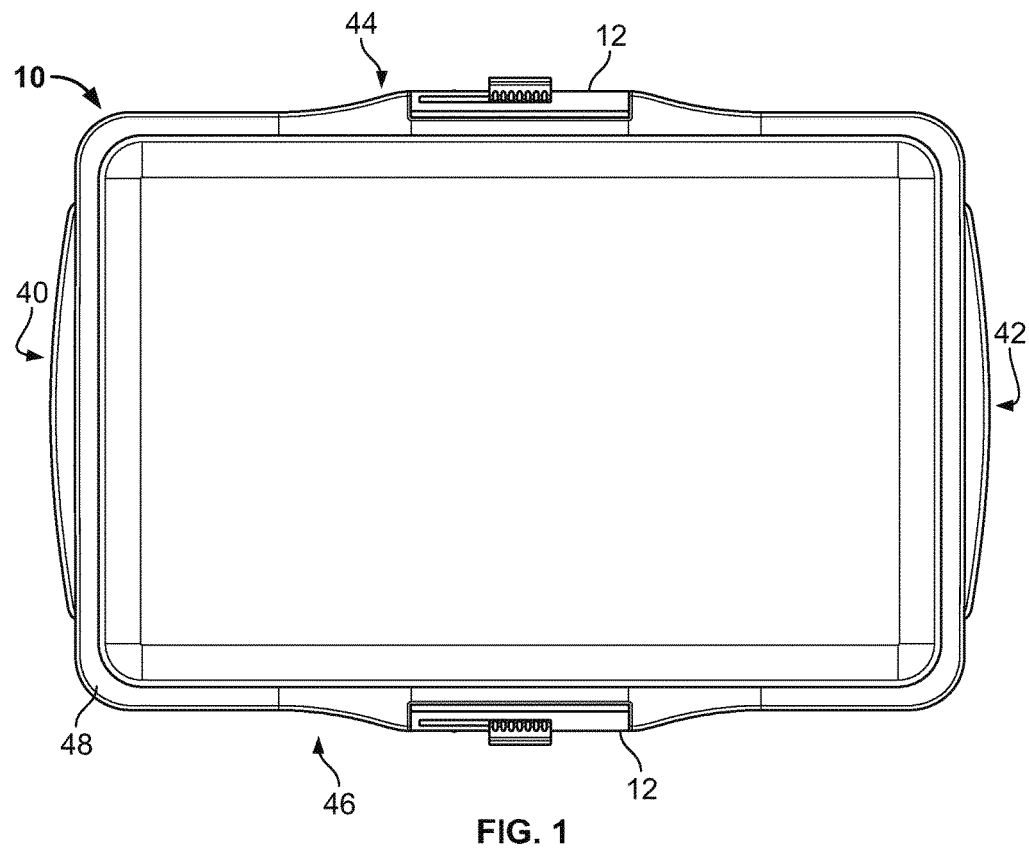
FIG. 1 is a top plan view of a non-adjustable pan lid.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

Various embodiments of the present disclosure include a removable, reversible adaptor that is connectable to a pan lid to adjust the pan lid for different sized bakeware pans. In a preferred embodiment, the bakeware pans are bakeware pans. More specifically, in one embodiment, an adjustable pan lid is adjusted to fit both a muffin bakeware pan and a narrower regular bakeware pan, where the two pans have the same nominal, operative dimensions (e.g., 9"×13") but different external dimensions. In this embodiment, the pan lid fits the muffin pan without any adjustment because it is the same width as the muffin pan; but the pan lid does not fit the regular bakeware pan without adjustment, as the lid is wider than the regular bakeware pan. To accommodate use with these differently sized pans, a pair of adaptors may be added to standard rotating clasp or locking members on opposite sides of the lid. For use with the wider muffin pan having a pair of extended sides, the adaptor is connected to the clasp in a first orientation, so that a generally flat first surface of the adaptor engage a bottom surface of each respective side of the muffin pan when the locking members are in their locked position. This surface need not be perfectly flat or planar, but should have a sufficient planar surface area to provide adequate contact with the surface it is engaging. For use with a narrower regular bakeware pan which has edges that do not project as far from the side of the pan, the adaptor is reversed and connected to the clasp in a second orientation, where structure on a second side of the adaptor engages an outer lip of the underside of the regular bakeware pan when the locking members are in their locked position. This structure helps to retain the lid and prevent unwanted movement of the pan in a lateral direction that would dislodge the lid from the pan.

In a further embodiment, the adaptors are fixed to the clasps or locking members on either side of the lid, and contain a pair of flexible members. In this embodiment, flexible members have a pair of flexible fingers that are moveable (or retractable) away from the under surface of a bakeware pan. For use with the wider muffin pan having a pair of extended sides, the flexible fingers of the flexible member are automatically flattened against a bottom surface of each respective side of the muffin pan when the locking members are in their locked position. For use with a narrower regular bakeware pan which has edges that do not project as far from the side of the pan, the flexible fingers of the flexible member are biased to a first curved position. The flexible fingers in the first position are protruding from the rotating member of the lid so as to engage an outer surface of the outer lip of the underside of the regular bakeware pan when the rotating locking members are in their closed position. This structure helps to retain the lid and prevent unwanted movement in a lateral direction that would dislodge the lid from the pan.

Figure 2:
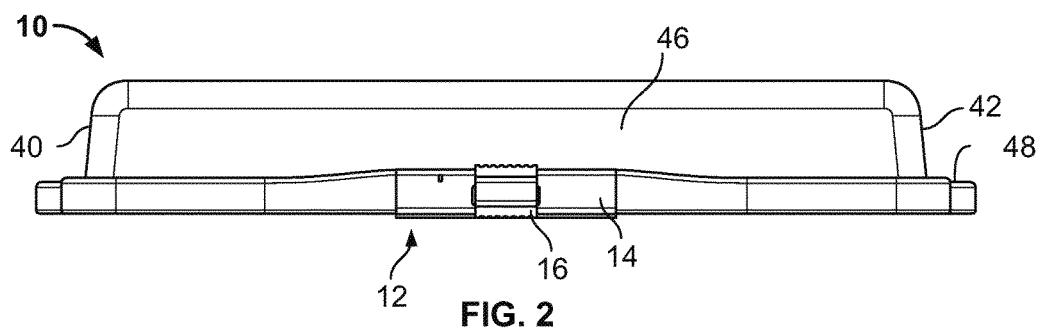
FIG. 2 is a side plan view of the non-adjustable pan lid of FIG. 1.

FIGS. 1 and 2 depict a top view and a side view of an exemplary non-adjustable pan lid 10 for use with a standard pan (not shown). The non-adjustable lid 10 has a typical rectangular shape with a pair of ends 40, 42 and a pair of sides 44, 46 and a shoulder structure 48 extending around the entire periphery thereof. Lid 10 further comprises two rotating locking members 12 on the opposite sides 44, 46 of the non-adjustable lid 10 for securing the lid 10 to the pan.

Figure 3:
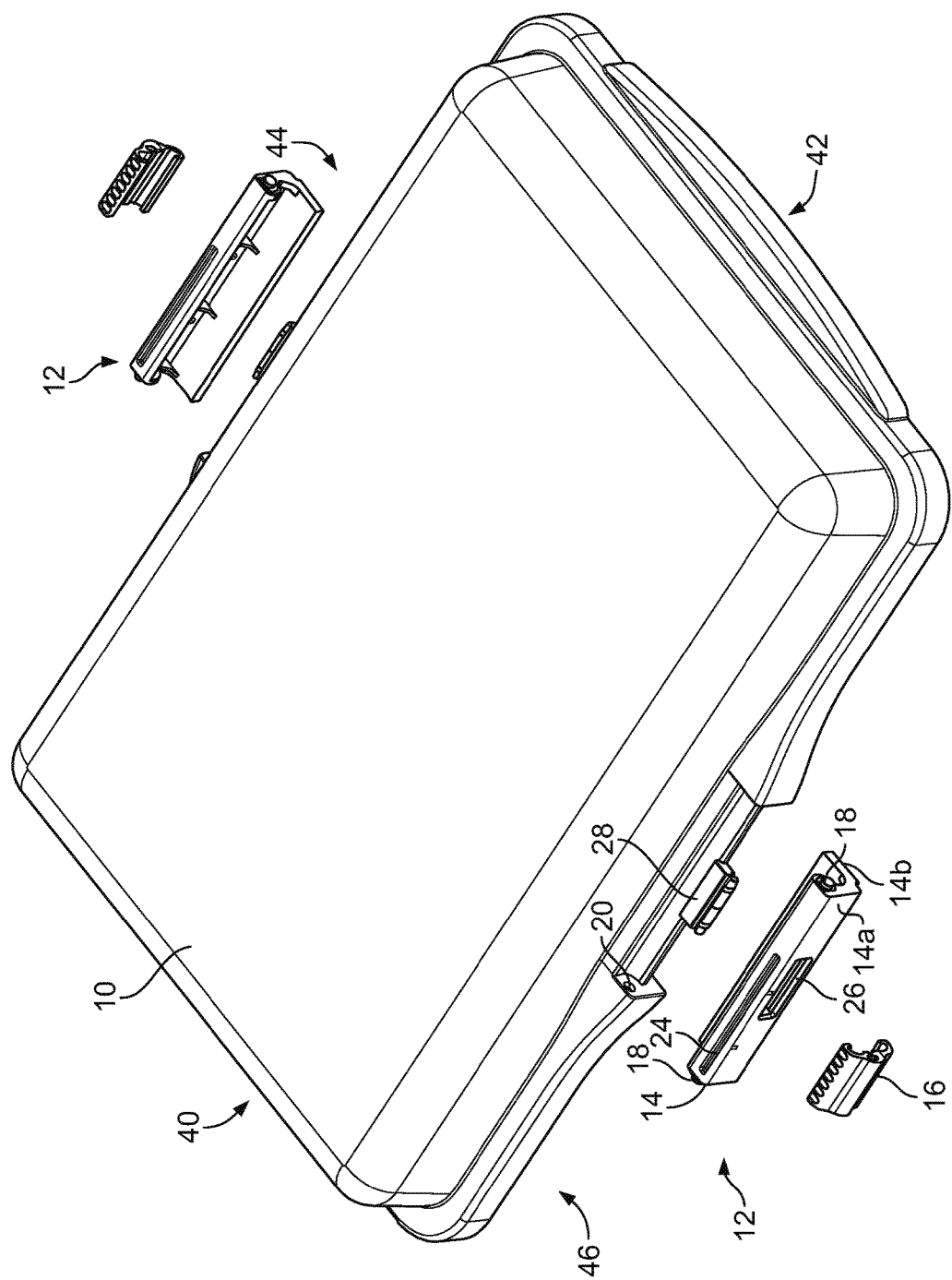
FIG. 3 is an exploded perspective view of the non-adjustable pan lid of FIG. 1.
Figure 7:
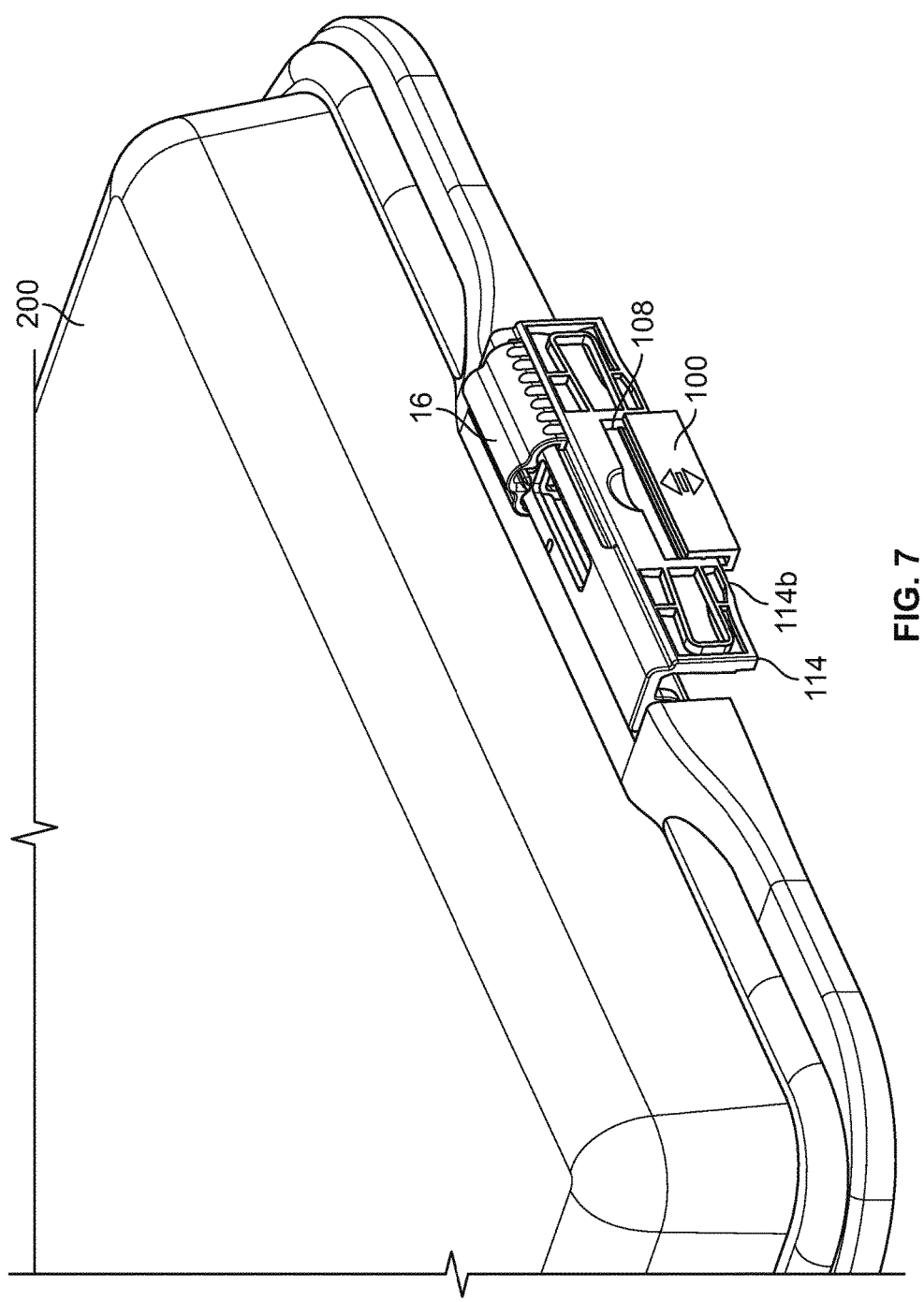
FIG. 7 is a perspective view of the adjustable pan lid of FIG. 6 with the adaptor partially engaged thereto in the first operative position.
Figure 8:
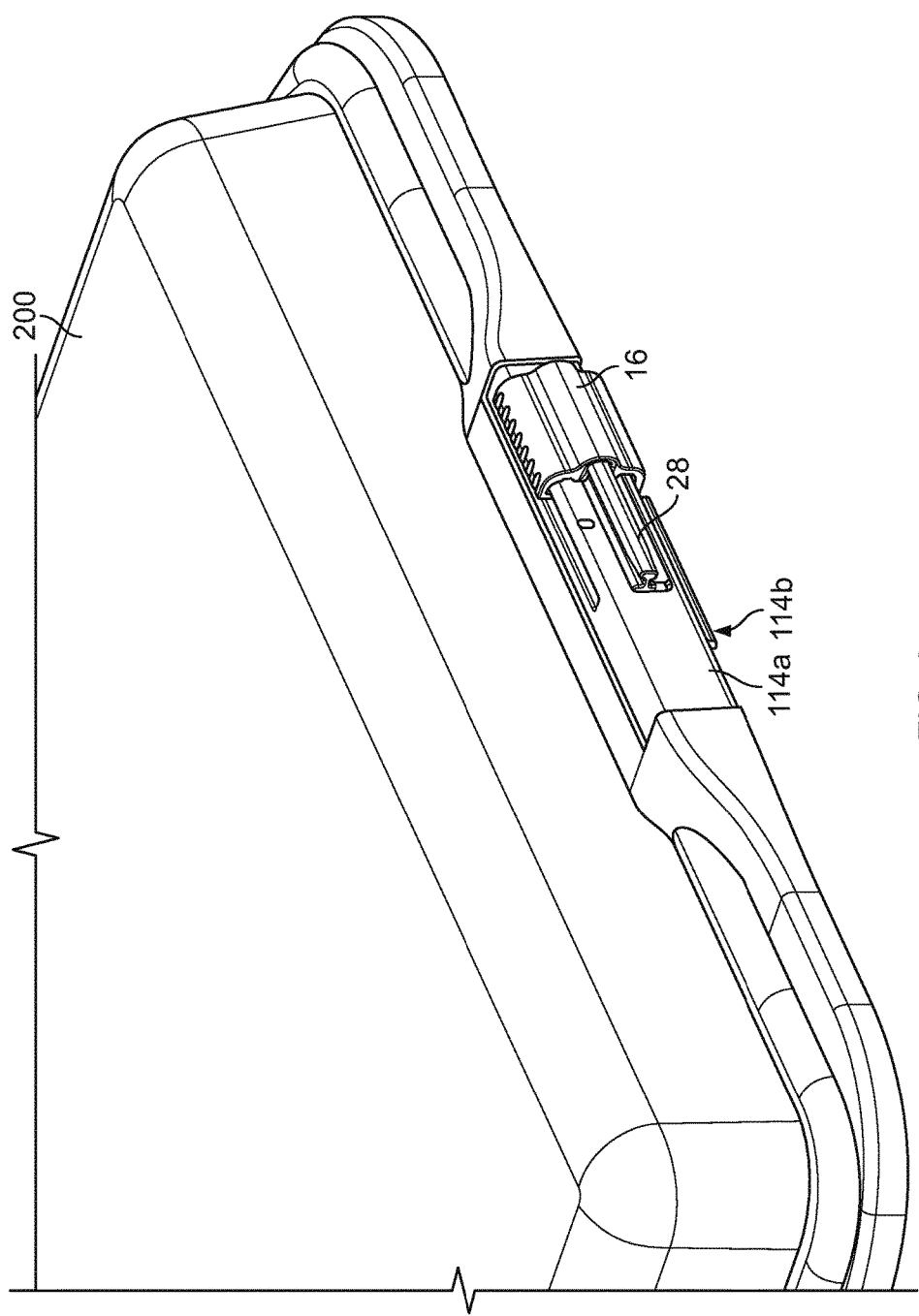
FIG. 8 is a perspective view of the adjustable pan lid of FIG. 6, with a clasp and the adaptor in a closed and unlocked position.
Figure 13:
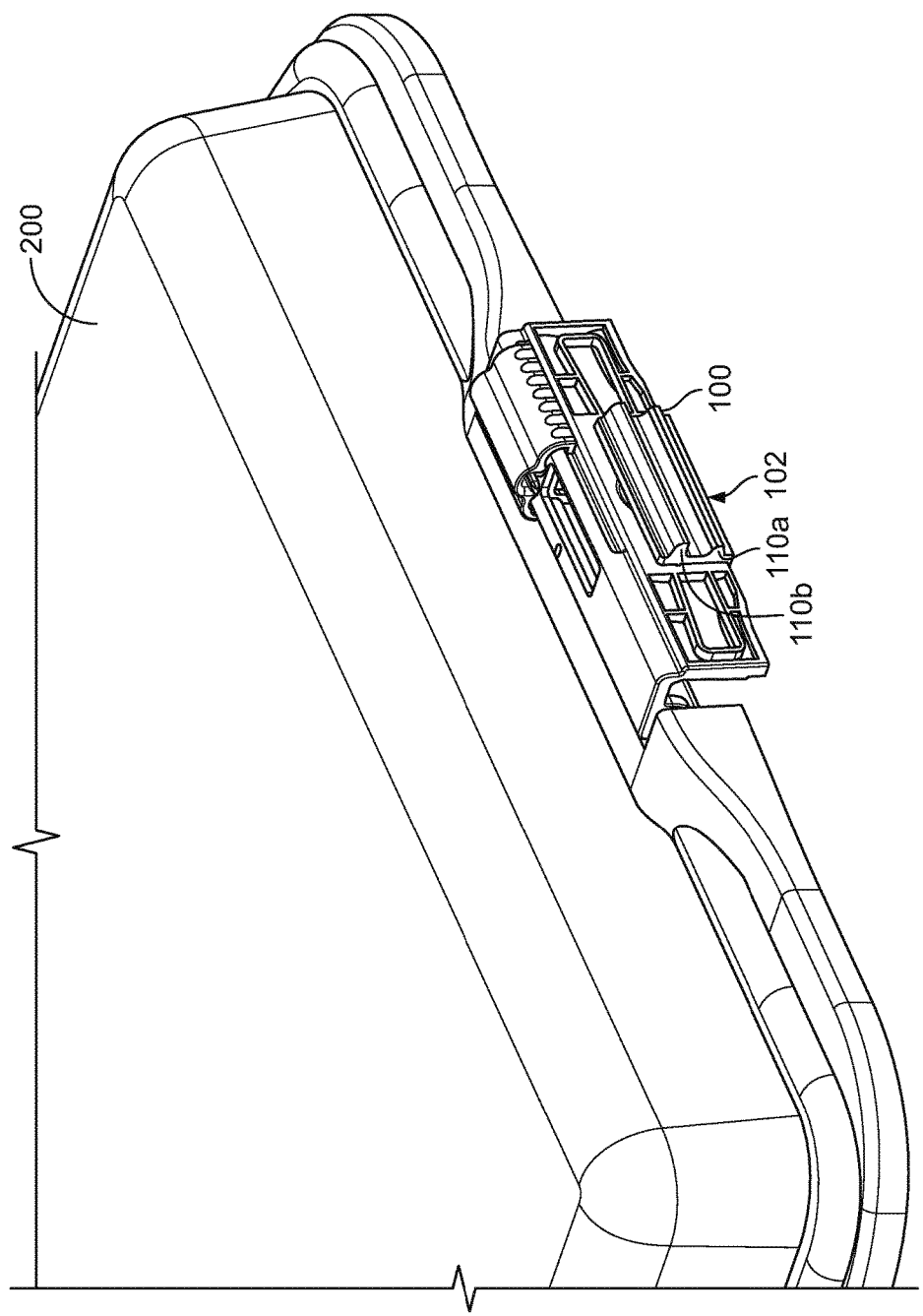
FIG. 13 is a perspective view of the adjustable pan lid of FIG. 12 with an adaptor partially engaged thereto in the second operative position.
Figure 14:
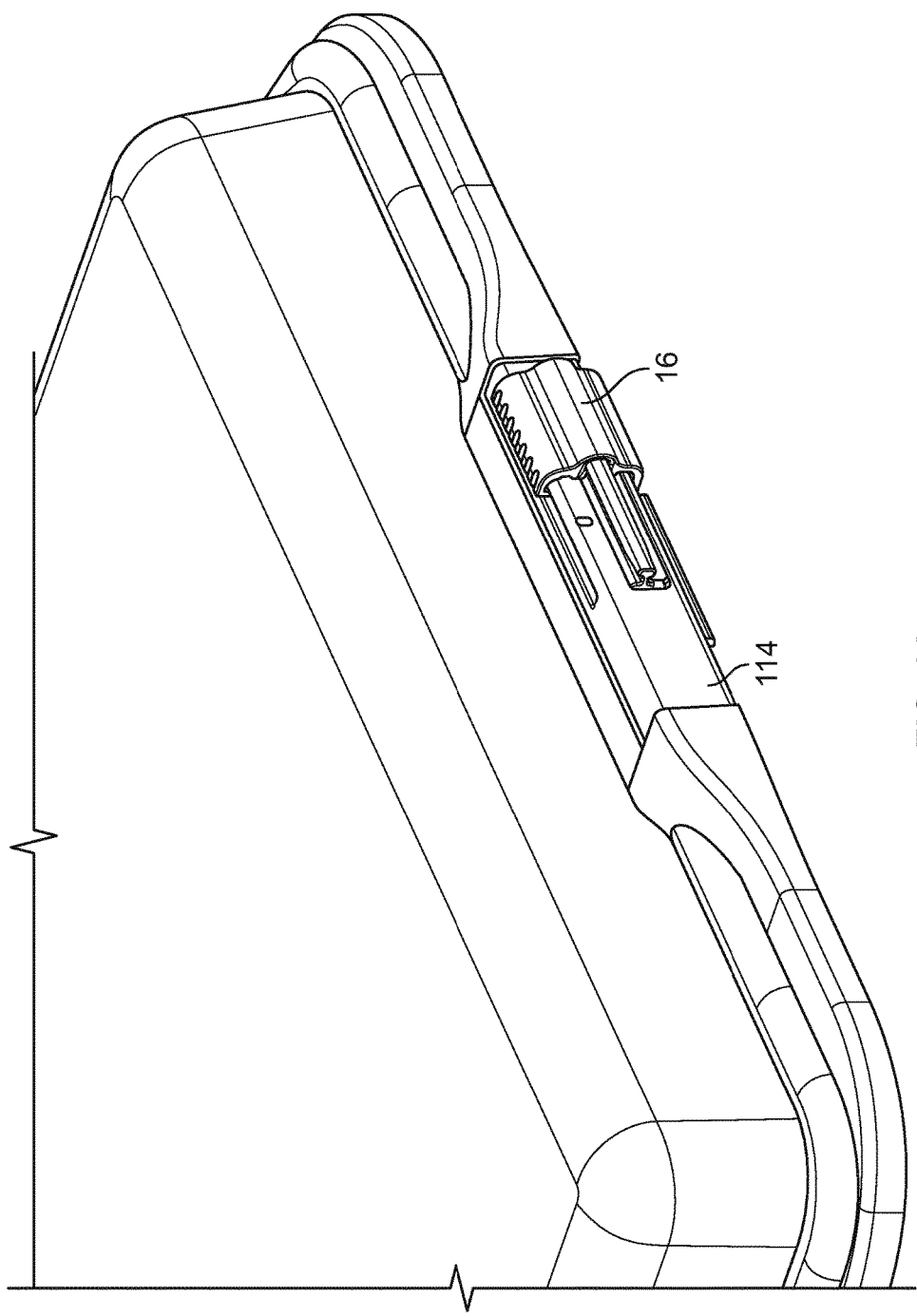
FIG. 14 is a perspective view of the adjustable pan lid of FIG. 12, with the adaptor and clasp in a closed and unlocked position.

FIG. 3 depicts an exploded view of the non-adjustable lid 10 and the rotating locking members 12. Rotating locking members 12 each comprise a clasp 14 and a slider 16 to lock the pan lid 10 to the pan. Clasp 14 is generally L-shaped having a main body 14a generally perpendicular to a leg 14b. The clasp 14 is connected to the pan lid 10 via a pin connector system. More specifically, clasp 14 includes two pins 18, or bosses, on opposite sides of main body 14a, and pins 18 are capable of being snapped into two receiving holes 20 in lid 10. The clasp 14 rotates about pins 18 from an open position to a closed position. As depicted in FIGS. 7 and 13, when clasp 114 is in an open position, main body 114a is generally horizontal and parallel to the top surface of the pan lid and leg 14b is vertical and perpendicular to the top surface of the bakeware pan 204, 208. As depicted in FIGS. 8 and 14, when clasp 114 rotates to a closed position, main body 114a is generally vertical and perpendicular to the top surface of lid 10 and leg 14b is horizontal and parallel to the top surface of lid 10, and is disposed under rotating locking member 12.

A slider 16 is connected to clasp 14 and is horizontally movable along clasp 14. More specifically, two curved edges 22 of the slider 16 snap into a track 24 cut along the top and bottom (not depicted) of clasp 14. A slider stop 28 is attached to the non-adjustable lid 10. When clasp 14 is in a closed position, an opening 26 on clasp 14 fits over slider stop 28. When slider 16 slides along track 24, it stops at the slider stop 28, which prevents clasp 14 from rotating in this position, to lock the non-adjustable lid 10 to the pan.

Figure 21:
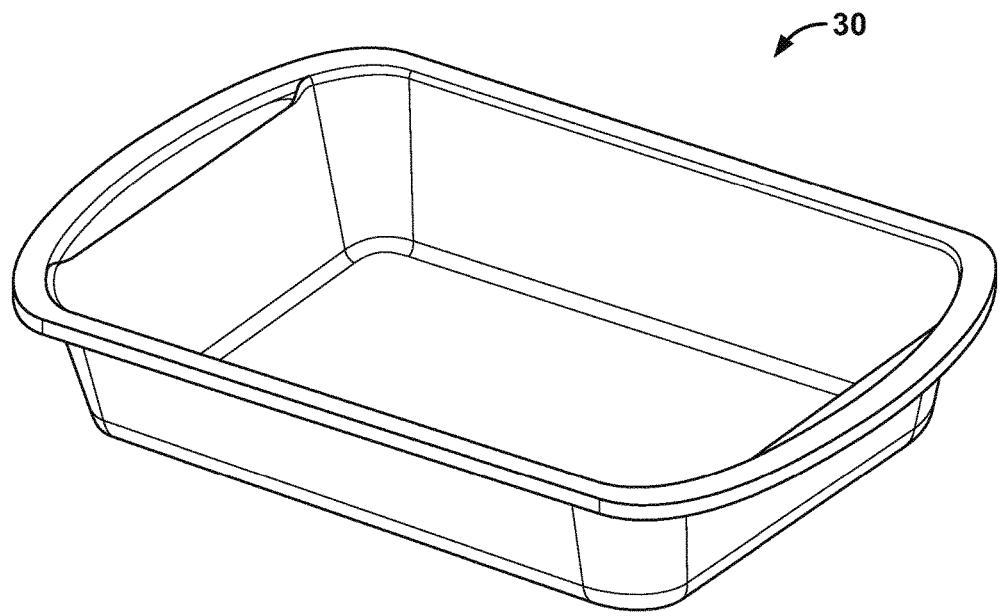
FIG. 21 depicts a representative rectangular bakeware pan for use with embodiments of this invention.
Figure 22:
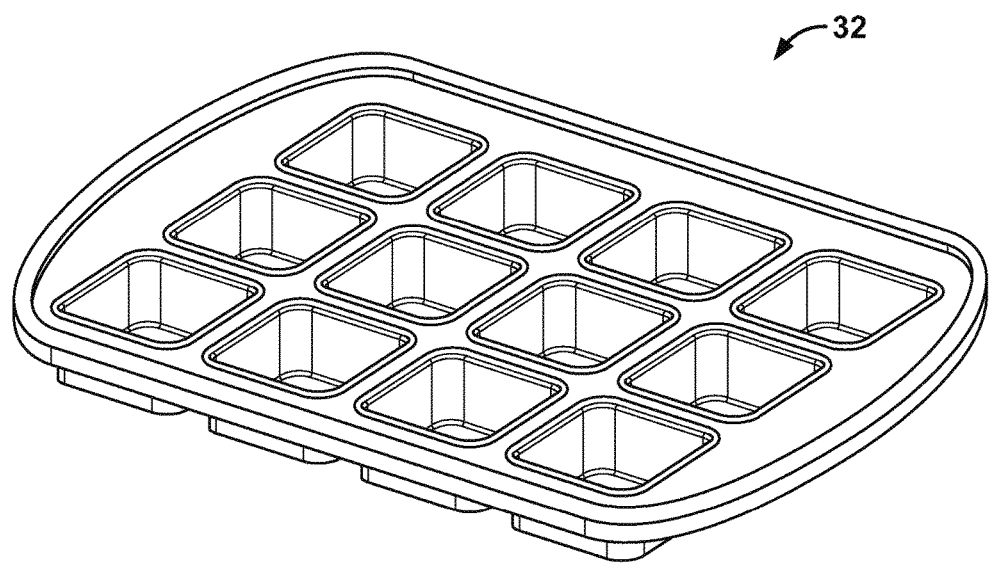
FIG. 22 depicts a representative rectangular muffin pan for use with embodiments of this invention, where the pans of FIGS. 21 and 22 have the same nominal dimensions but different external dimensions.

As depicted in FIGS. 21 and 22, two pans may have the same nominal, operative dimensions (e.g., 9"×13") but different external dimensions. FIG. 21 depicts a typical rectangular 9"×13" bakeware pan 30. FIG. 22 depicts a typical rectangular 9"×13" muffin pan 32. The external width of muffin pan 32 is greater than the width of bakeware pan 30, and a typical lid with a fixed width, such as described above with respect to FIGS. 1-3, cannot fit both pans. For example, if the width of the underlying pan is too small, the pan will be able to translate laterally, i.e., side-to-side, and this movement may be sufficient to dislodge the pan from the lid.

Figure 4:
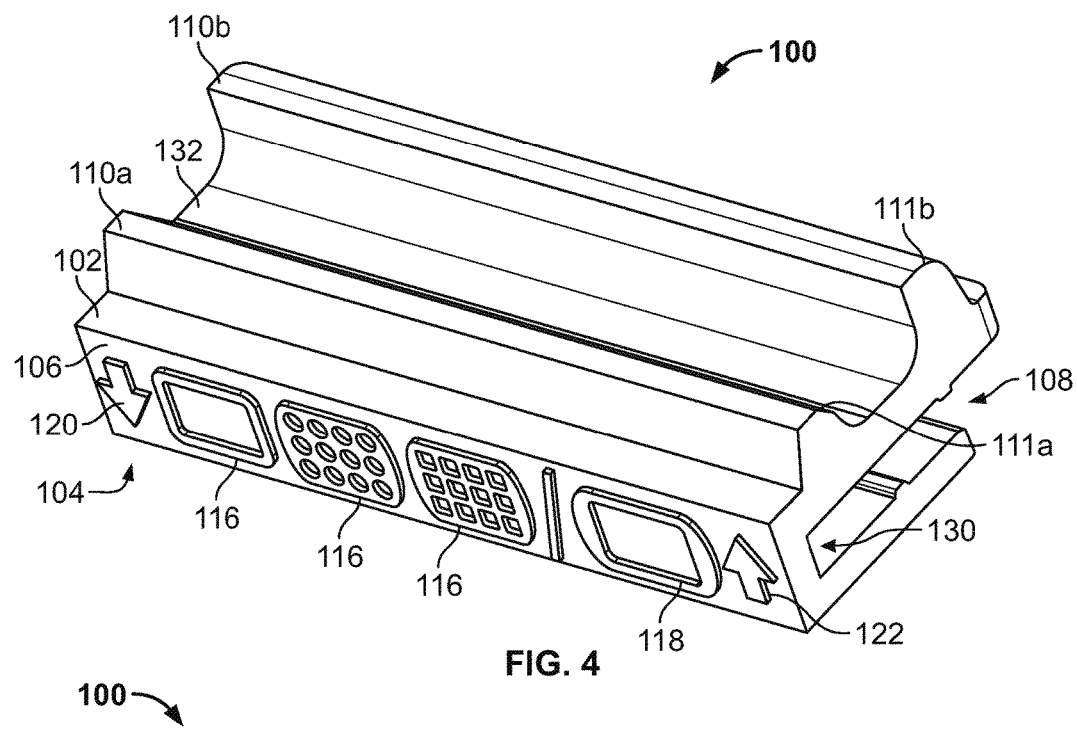
FIG. 4 is a perspective view of an adaptor for an adjustable pan lid according to the present disclosure.
Figure 5:
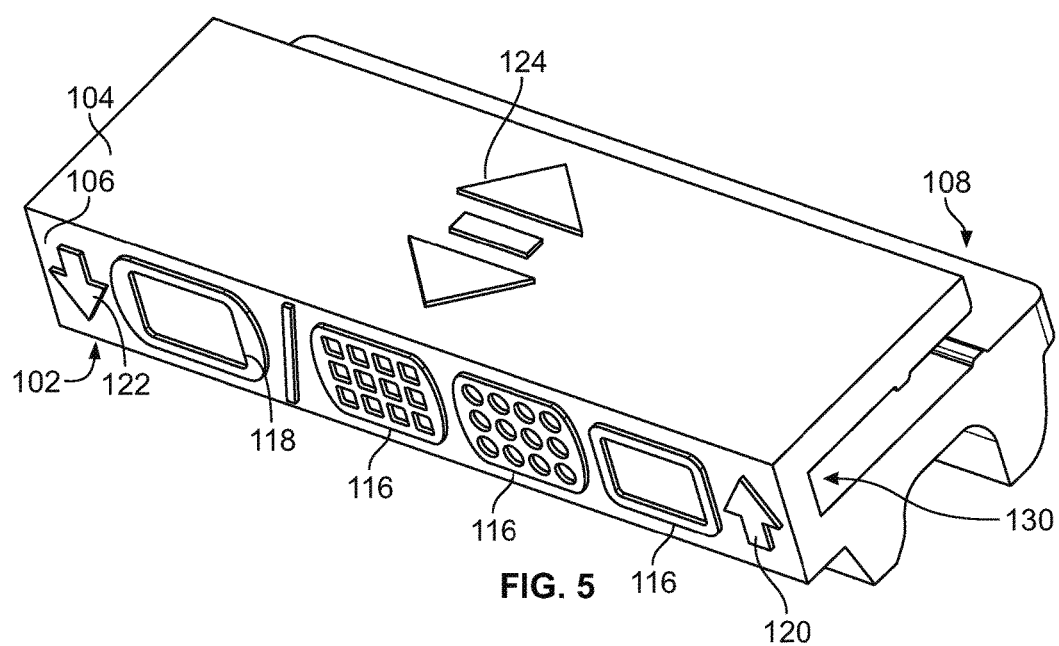
FIG. 5 is a perspective view of the adaptor of FIG. 4, as viewed from the opposite side of the view in FIG. 4.

FIGS. 4 and 5 depict a reversible, removable adaptor 100 that may be connected to the rotating locking members 112 of a pan adjustable lid 200 so as to render the pan adjustable lid 200 capable of being used with pans having different sizes, in accordance with one embodiment of this disclosure. FIGS. 6, 7, 8, and 9, depict one orientation of adaptor 100 for use with a narrower bakeware pan such as the 9"×13" rectangular bakeware pan 30 shown in FIG. 21. FIGS. 12, 13, 14, and 15, depict another orientation of adaptor 100 on pan adjustable lid 200 for use with a muffin pan such as the 9"×13" bakeware pan of FIG. 22. These figures also depict a clasp 114 that is structurally similar to clasp 14 described above, but for the variations necessary to accommodate adaptor 100.

The adaptor 100 has a generally rectangular shape with three closed sides, namely 102, 104, 106 and one open side 108 forming a slot 130. The three closed sides include a ridged surface 102 (depicted as the top surface of FIG. 4), a generally flat surface 104 (depicted as the top surface of FIG. 5) opposite the ridged surface 102, and a middle joining surface 106 joining ridged surface 102 and generally flat surface 104. The three closed sides form a C-shape, wherein the ridged surface 102 protrudes further out than flat surface 104. As depicted in FIG. 4, ridged surface 102 may include one or more ridges 110 that extend the entire width of adaptor 100. In certain embodiments, the ridged surface includes at least two ridges 110a, 110b such that a groove 132 is formed between the at least two ridges 110a, 110b. As will be described in greater detail below, in certain embodiments the groove 132 is shaped to fit around an outer lip at the perimeter of certain bakeware pans. In certain alternative embodiments, the ridged surface includes only a first ridge 110a. It should be appreciated that only one ridge is necessary for the adaptor 100 enable a bakeware lid to adjust to a narrower pan. In certain embodiments, each ridge 110a, 110b comprises a biased angle surface 111 to enable the ridge to form a more secure engagement with the pan 204. In a preferred embodiment, the biased angle is a three degree angle.

Opposite the middle joining surface 106 is an open side 108 of adaptor 100 that forms slot 130 that fits onto the rotating locking member 12 of pan adjustable lid 200. As will be described in greater detail below, adaptor 100 slides onto the leg 114b of clasp 114 of the rotating locking member 12. As shown in FIG. 5, in this example embodiment, an arrow 124 on the generally flat surface 104 indicates the direction that adaptor 100 slides onto and off of rotating locking member 12. Other indicia may be included here.

As further depicted in FIGS. 4 and 5, in this embodiment, middle joining surface 106 also includes representative indicia 116, 118. The indicia 116, 118 indicate the direction that each surface of adaptor 100 should face for the particular bakeware pan that is being covered. For a first set of pans represented by indicia 116 the arrow 120 indicates that flat surface 104 should be facing up as the open side 108 of the adaptor 100 slides onto rotating locking member 12. For a second, different sized bakeware pan represented by indicia 118, the arrow 122 indicates that adaptor 100 should be in the reverse direction as open side 108 of adaptor 100 slides onto rotating locking member 12. Other indicia may be included here, and the indicia disclosed herein is optional.

Figure 6:
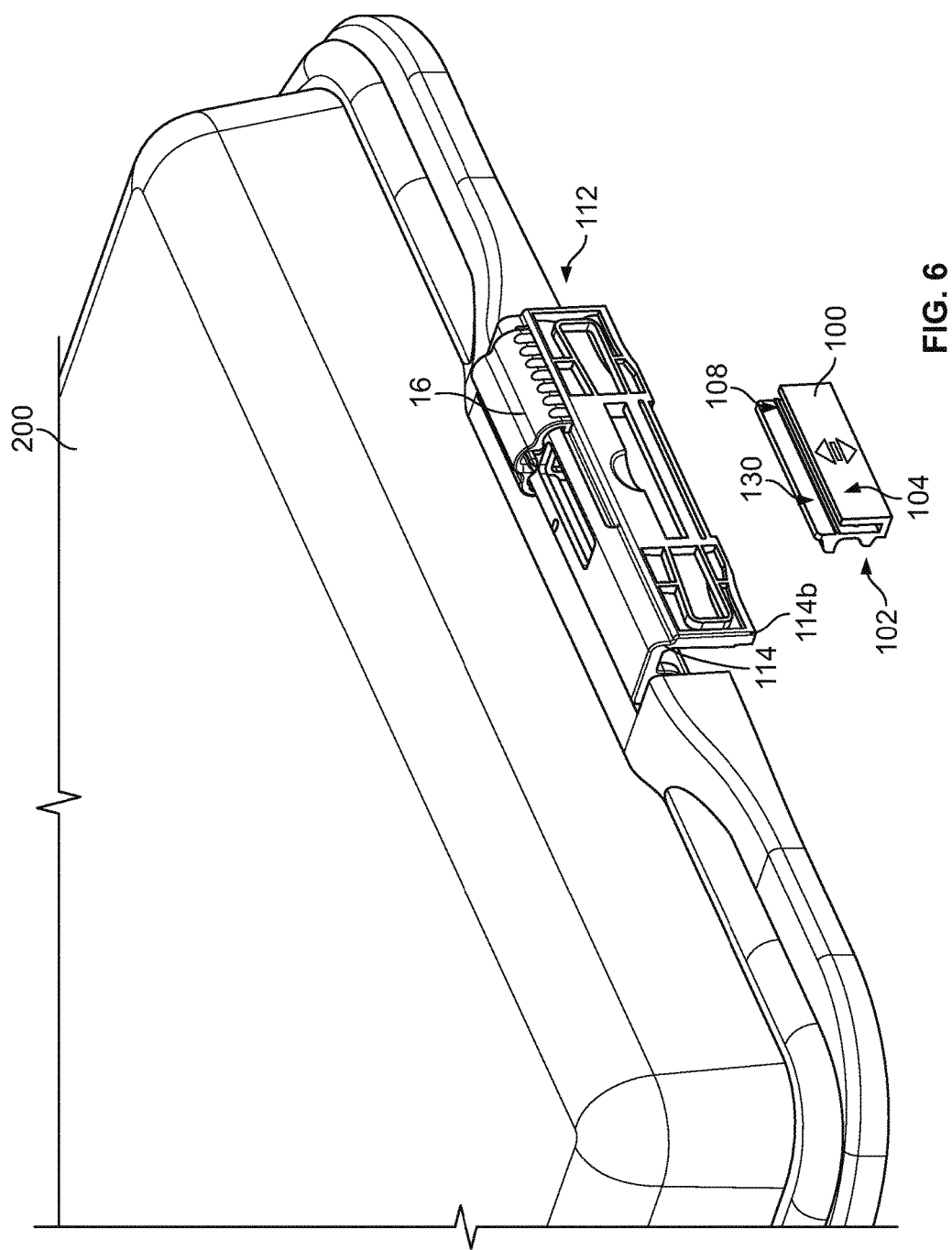
FIG. 6 is a perspective view of an adjustable pan lid with an adaptor, where the adaptor oriented to be mounted to the lid in a first operative position.

As noted above, FIGS. 6-11 depict one orientation of adaptor 100 on pan adjustable lid 200 for use with a narrower bakeware pan such as the 9"×13" rectangular bakeware pan 30 of FIG. 21. In FIG. 6, clasp 114 on the adjustable lid 200 is in an open position and adaptor 100 is not yet attached to clasp 114. To add the adaptor 100 to clasp 114, slot 130 of adaptor 100 slides onto leg 14b. In this orientation, for use with a pan that is narrower than the width of the adjustable lid 200, adaptor 100 is oriented so its generally flat surface 104 faces outward (and is thus inoperative) and ridged surface 102 faces inward towards the bottom of the pan once the clasp 114 is rotated to the closed position. In this position, ridged surface 102 is able to engage the bottom of the bakeware pan, and in particular a lip 206 of pan 204, as shown most clearly in FIG. 11.

Figure 9:
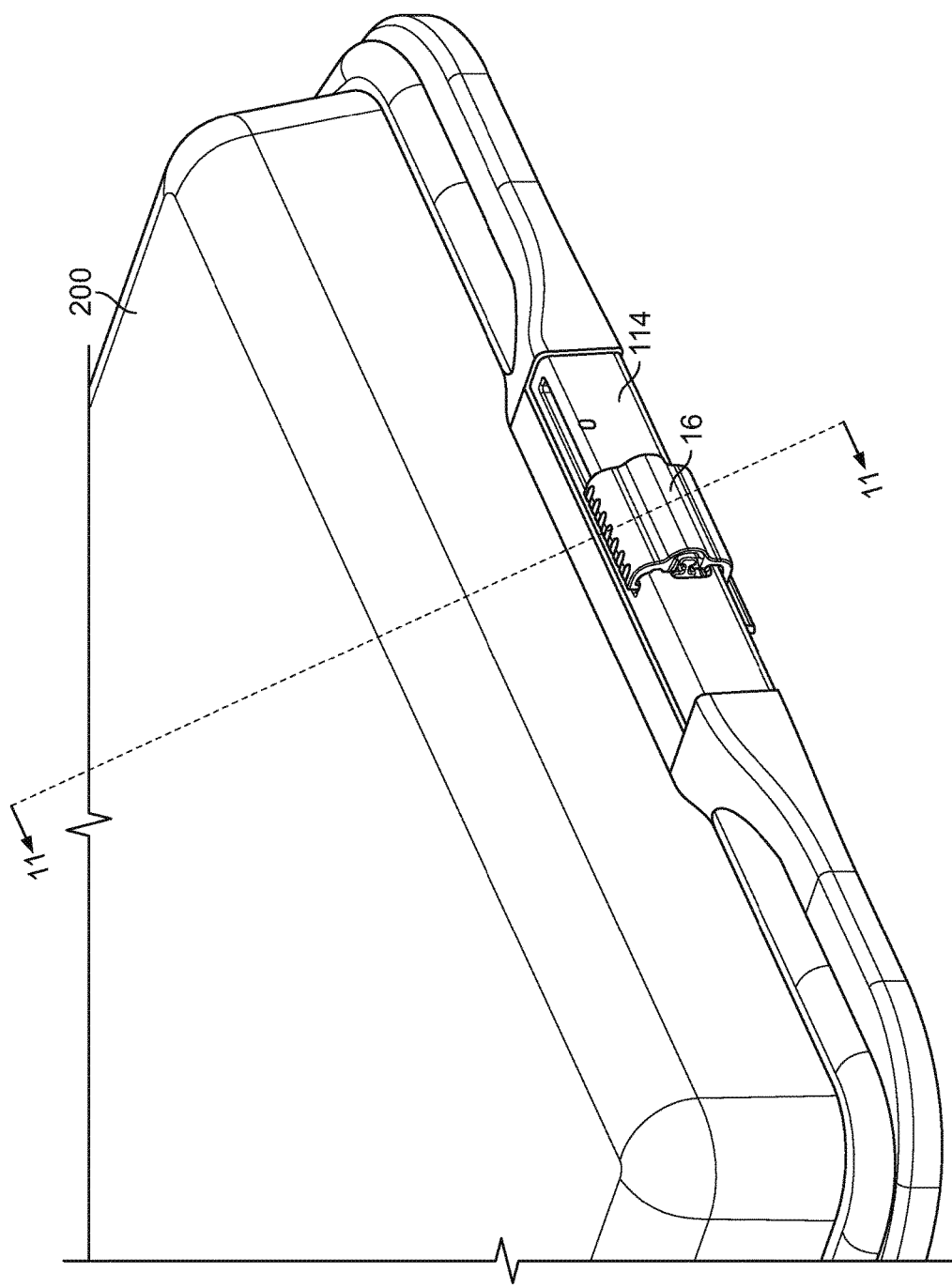
FIG. 9 is a perspective view of the adjustable pan lid of FIG. 6, with the clasp in the closed and locked position.

FIG. 7 depicts adaptor 100 just before it is fully attached to clasp 114. More specifically, slot 130 on open side 108 of adaptor 100 slides over the bottom edge of leg 14b. FIG. 8 depicts adjustable lid 200 where adaptor 100 is fully attached to clasp 114, which is now in its closed and unlocked position. Once adaptor 100 is connected to clasp 114, the entire clasp is rotated so that leg 14b and adaptor 100 are rotated under the bottom of adjustable lid 200. The main body 114a of clasp 114 is now perpendicular to the top of the adjustable lid 200. FIG. 9 depicts the adjustable lid 200 with slider 16 moved to the center of clasp 114, such that clasp 114 is in the closed and locked position.

Figure 10:
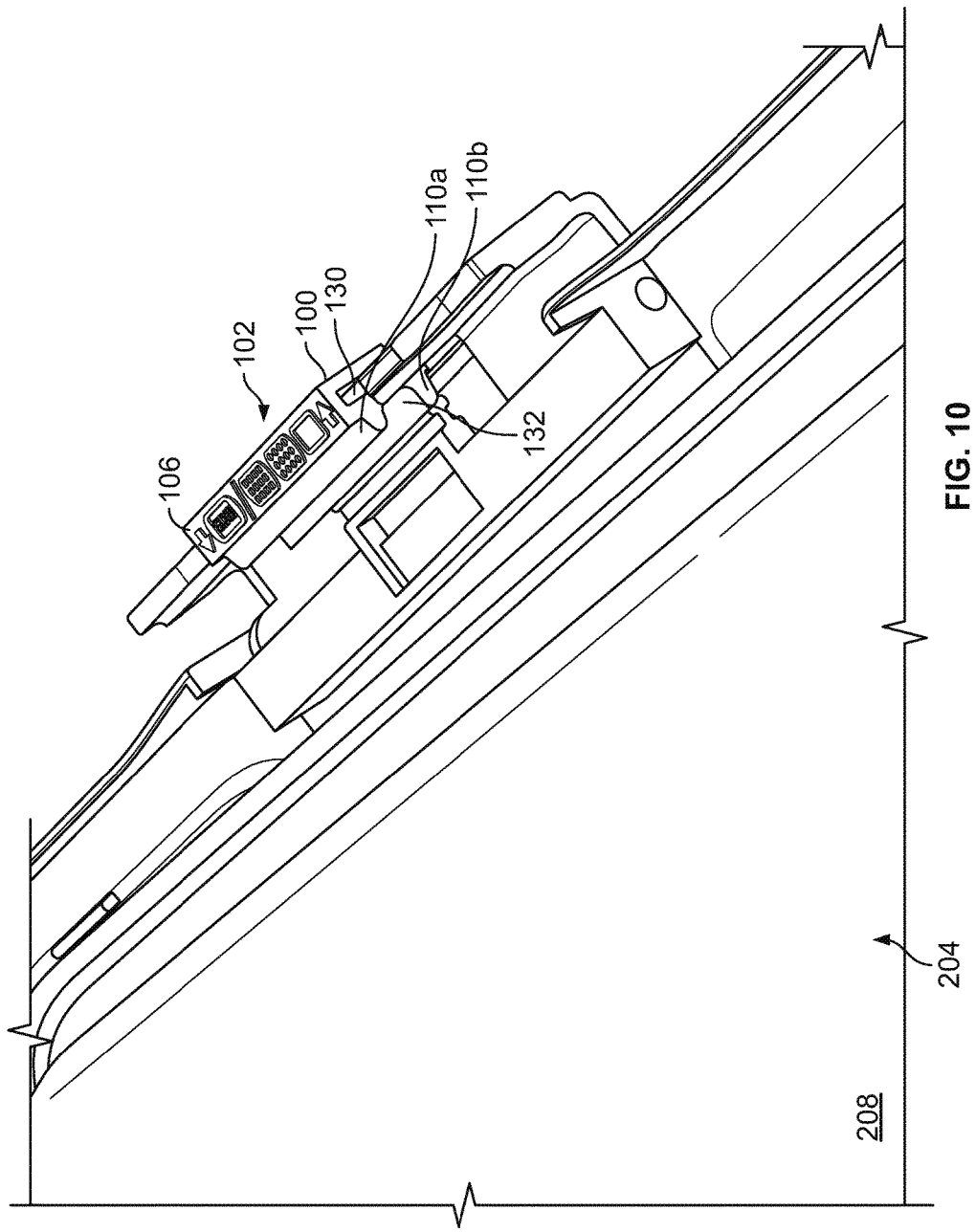
FIG. 10 is a bottom perspective view of the adjustable bakeware pan adapter lid of FIG. 7 on a bakeware pan, with the adaptor in the first operative position.
Figure 11:
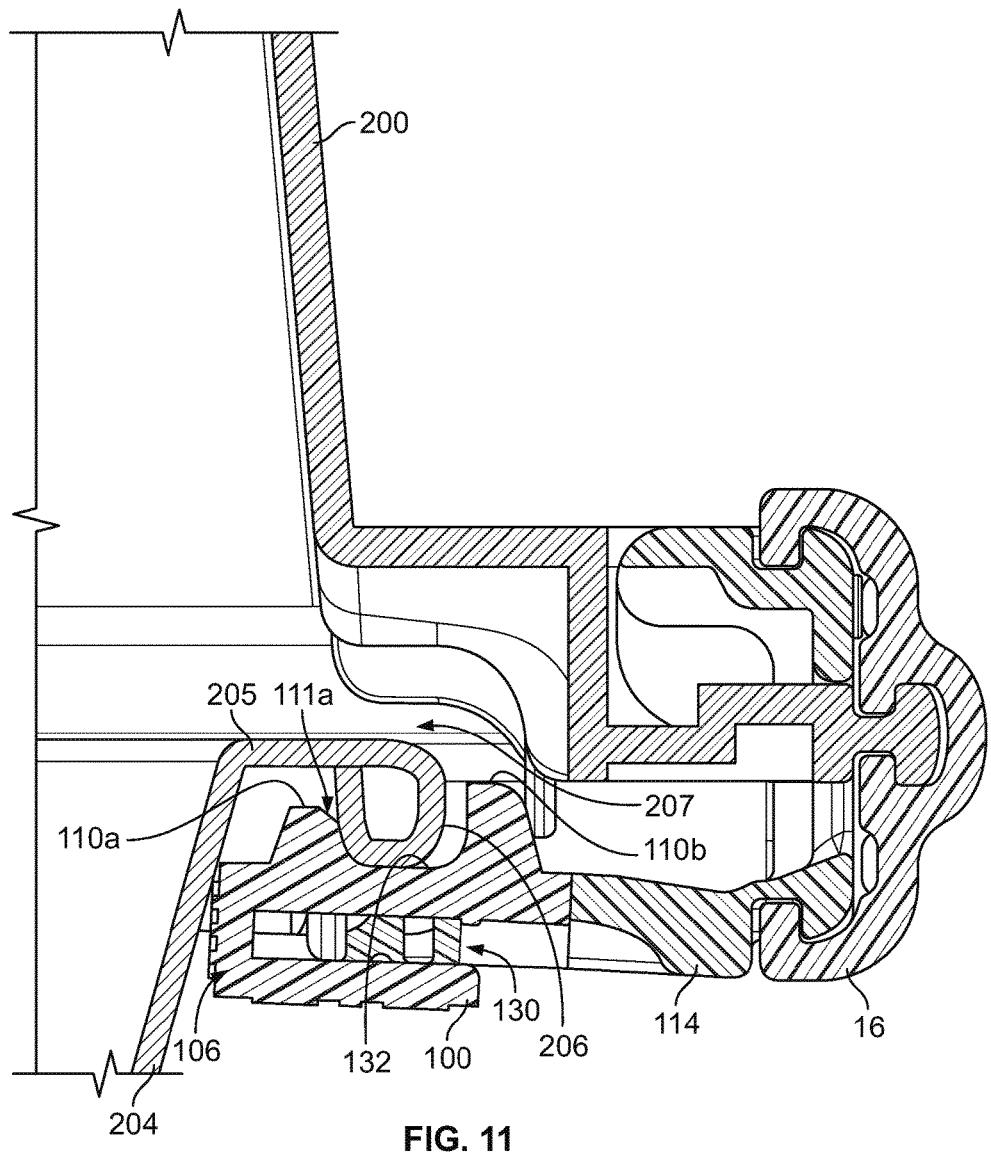
FIG. 11 is a cross-sectional view of the adjustable pan lid of FIG. 6 on a bakeware pan, along the lines 11-11 of FIG. 9.

FIG. 10 depicts a bottom view of the adjustable lid 200 with clasp 114 in the open position and a representative bakeware pan 204. The ridged surface 102 of adaptor 100 is facing inward and when clasp 114 is rotated to a closed position, ridged surface 102 can engage the bottom 208 of bakeware pan 204. FIG. 11 depicts a cross-sectional view of pan adjustable lid 200 in a closed position and bakeware pan 204 along cross-sectional lines 11-11 of FIG. 9. This bakeware pan 204 is narrower than the width of pan adjustable lid 200. The outer edge 205 of bakeware pan 204 does not extend enough to meet the pan adjustable lid 200 as indicated by the gap 207 between the outer lip 206 of the pan 204 and the adjustable lid 200. As shown here, though, clasp 114 is in a closed position and ridged surface 102 of adaptor 100 engages with the outer lip 206 of bakeware pan 204. More specifically, outer lip 206 of bakeware pan 204 fits between the two ridges 110a, 110b into the groove 132 of ridged surface 102. Accordingly, adjustable lid 200 is capable of being secured to the narrower pan 204.

It should be appreciated that the ridge 110a closest to the middle joining surface 106 of the adaptor 100 is necessary for the adaptor 100 to enable the adjustable lid 200 to fit the narrower pan 204. More specifically, to retain the adjustable lid 200 from dislodging from the pan 204, the adaptor 100 prevents unwanted movement in the lateral direction towards the center of the pan 204. Accordingly, in an embodiment with only one ridge 110a, the outer lip 206 of the pan 204 engages the ridge 110a so as to prevent unwanted movement of the pan 204 in a lateral direction towards the center of the pan. In this embodiment, the second ridge 110b is not necessary to prevent movement in this direction.

Figure 12:
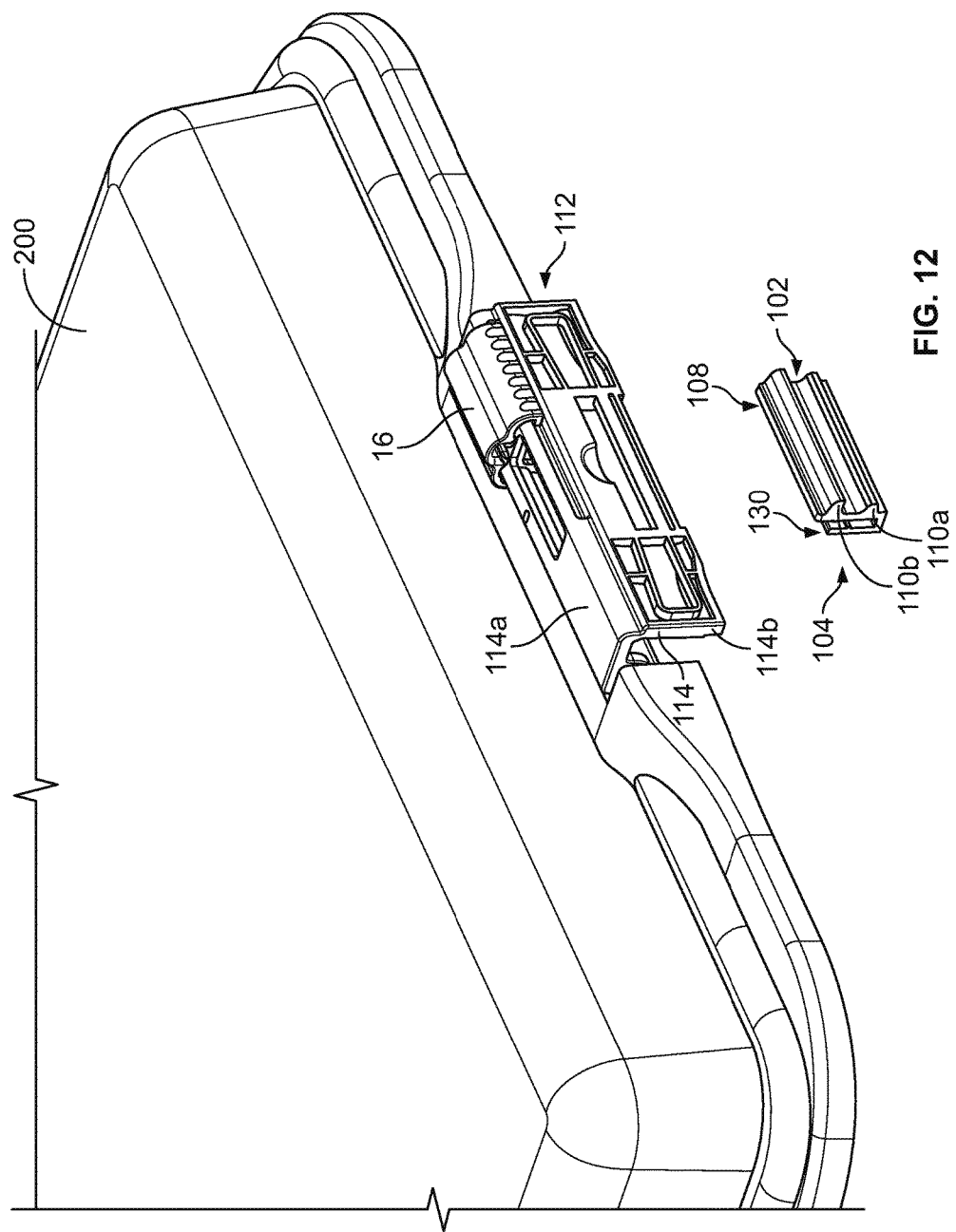
FIG. 12 is a perspective view of an embodiment of an adjustable pan lid with an adaptor, similar to FIG. 6, but with the adaptor oriented to be mounted to the lid in a second operative position.

As noted above, FIGS. 12-15 depict another orientation of adaptor 100. As depicted in FIG. 12, clasp 114 on adjustable lid 200 is in an open position and adaptor 100 is not yet attached to clasp 114. To add adaptor 100 to clasp 114, slot 130 of adaptor 100 slides onto leg 114b. However, adaptor 100 is oriented in the opposite direction as for FIGS. 6-11, and ridged surface 102 of adaptor 100 is now facing outwards. Turning to FIG. 13, the adaptor 100 is attached to clasp 114, and open side 108 of adaptor 100 fits around the bottom edge of leg 14b.

Figure 15:
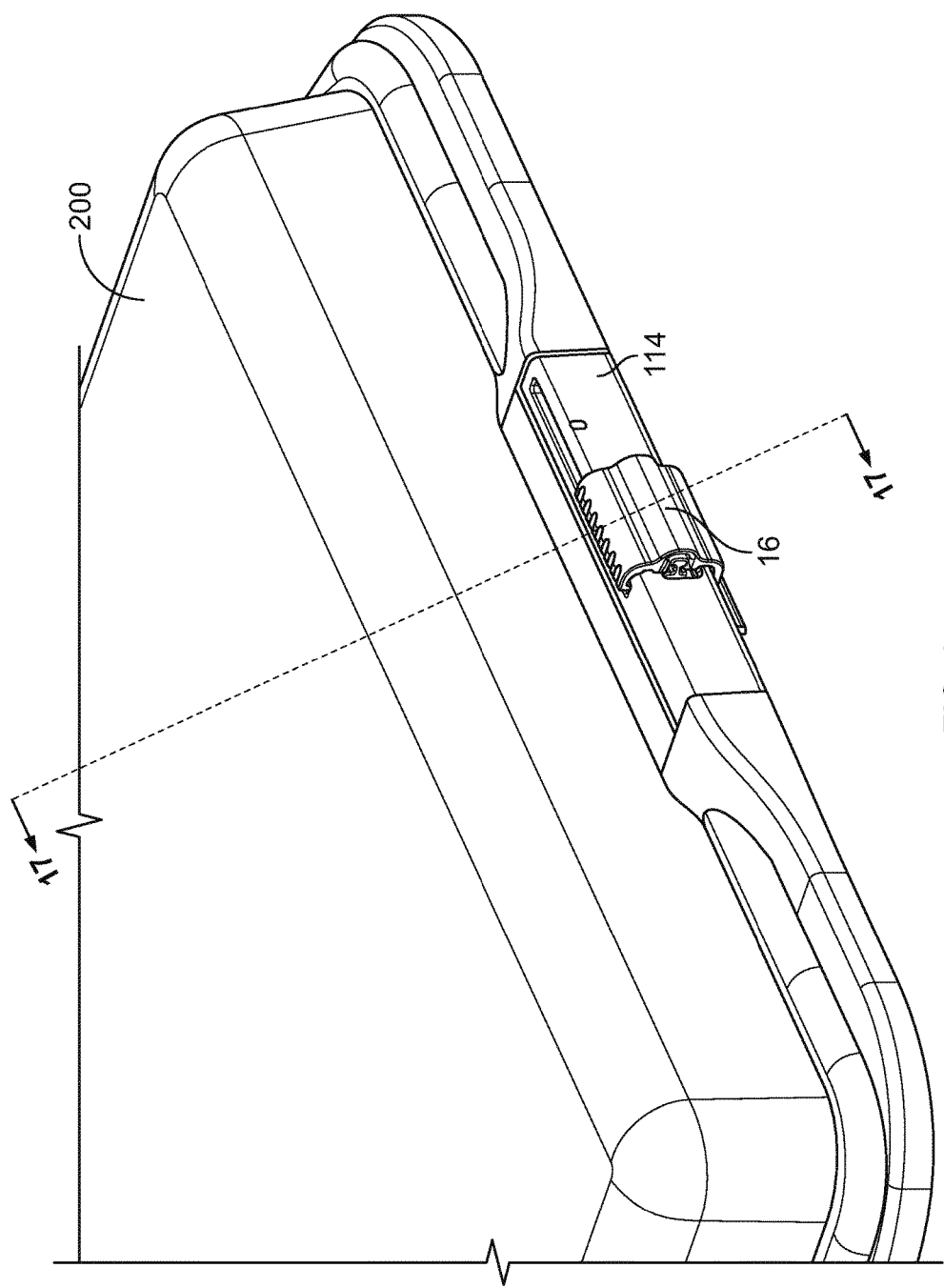
FIG. 15 is a perspective view of the adjustable pan lid of FIG. 12 with the clasp in a closed and locked position.

FIG. 14 depicts adjustable lid 200 in a closed and unlocked position. Once adaptor 100 is connected, clasp 114 is rotated so that leg 14b and adaptor 100 are rotated under the bottom of the adjustable lid 200. The main body 114a of clasp 114 is now perpendicular to the top of adjustable lid 200. FIG. 15 depicts the adjustable lid 200 in a closed and locked position, as slider 16 is moved to the center of clasp 114 to lock the adjustable lid 200.

Figure 16:
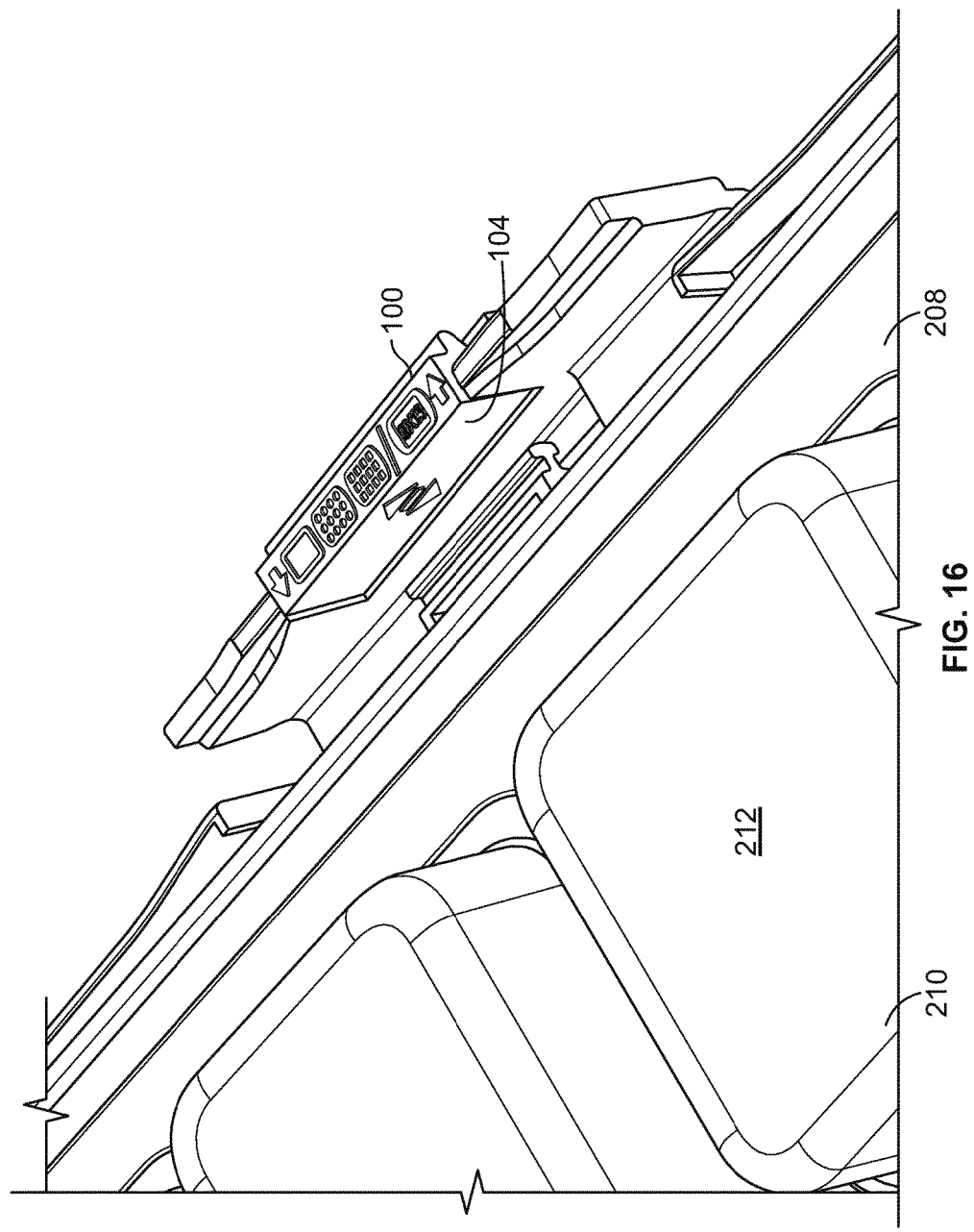
FIG. 16 is a bottom perspective view of the adjustable pan lid and adaptor of FIG. 12 on a bakeware pan, with the adaptor in the second operative position.

FIG. 16 depicts a bottom view of the adjustable lid 200 in an open position and a representative muffin pan 210, which generally has the same width as adjustable lid 200. As depicted in FIG. 16, the flat surface 104 of the adaptor 100 is facing inward and when clasp 114 is rotated to a closed position, the flat surface 104 will be against the bottom of a bakeware pan (and thus in an operative position) 210. Thus, in this orientation, the generally flat surface 104 of adaptor 100 engages the bottom surface 212 of the side of muffin pan 210.

Figure 17:
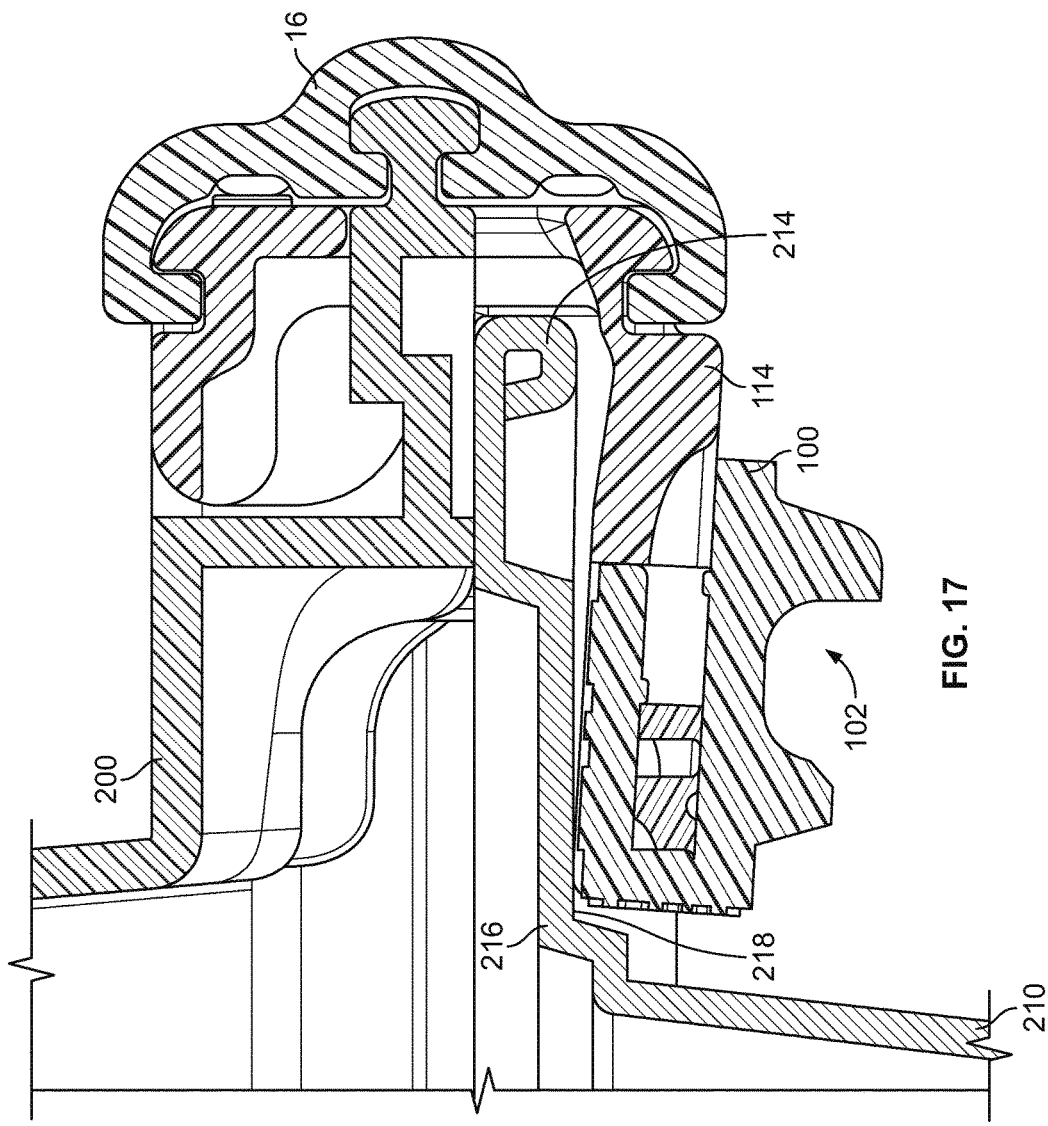
FIG. 17 is a cross-sectional view of the adjustable pan lid of FIG. 12 on a bakeware pan, along the lines 17-17 of FIG. 15.

FIG. 17 depicts a cross-sectional view of pan adjustable lid 200 in a closed position and adaptor 100 in the second operative position. The clasp 114 is in a closed position and ridged surface 102 of adaptor 100 is facing down and is not engaged with muffin pan 210. The external width of muffin pan 210 is greater than the external width of pan 204 of FIG. 11, and, therefore, the outer edge 216 of the muffin pan 210 extends further out relative to the pan adjustable lid 200 than the outer edge 205 of the bakeware pan 204 of FIG. 11. Because the outer lip 214 extends into the clasp 114 of the rotating locking member 112, the pan adjustable lid 200 is capable of engaging with the muffin pan 210 without the need for additional engagement. Accordingly, as shown here, flat surface 104 of adaptor 100 engages with the bottom surface 218 of the outer edge 216 of the muffin pan 210, and does not actively restrain against lateral movement.

Figure 18:
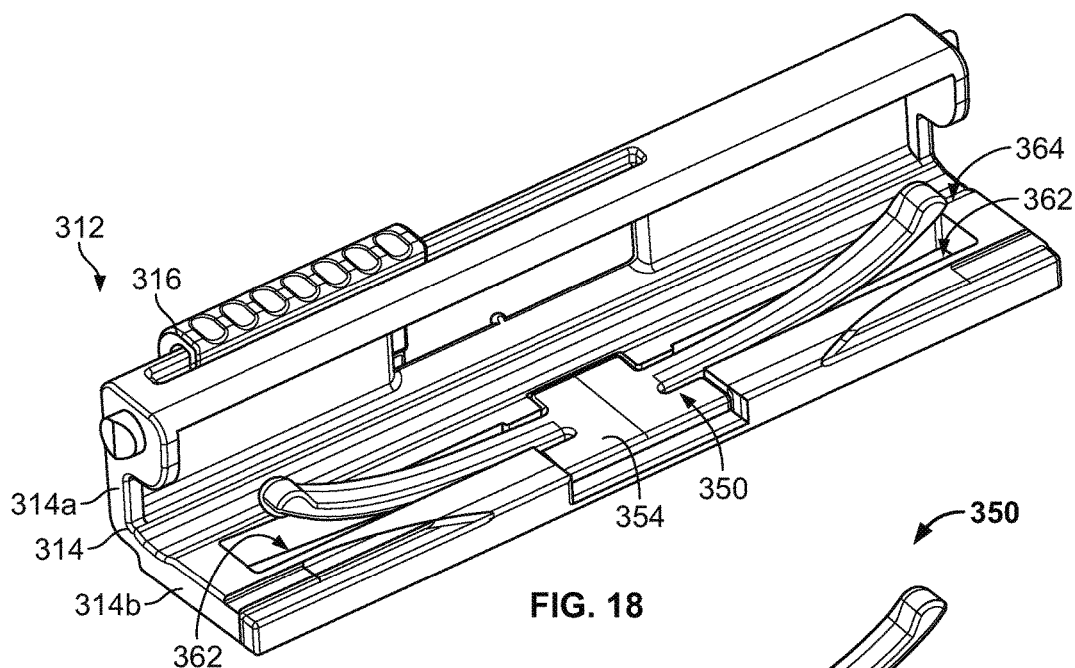
FIG. 18 is a perspective view of a rotating locking member with a flexible member for an adjustable pan lid according to one embodiment of the present disclosure.
Figure 19:
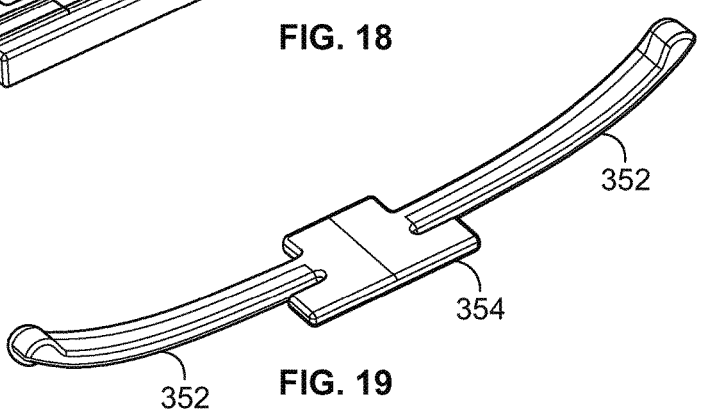
FIG. 19 is a top perspective view of the flexible member for an adjustable pan lid of FIG. 18.

In a further embodiment, the adaptors are fixed to the locking members, or integrally formed as part of the locking members located on either side of the lid, and comprise a pair of flexible members. FIG. 18 depicts a rotating locking member 312 with a clasp 314 and a slider 316 to lock a pan lid to a pan. As before, clasp 314 has a main body 314a and a leg 314b. In this exemplary embodiment, a flexible member 350 is connected to the clasp 314 of the rotating locking member 312 by a connecting member 356. FIG. 19 depicts a top perspective view of the flexible member 350, which comprises a center base 354 and two flexible fingers 352 extending from the base 354. Flexible fingers 352 are moveable between a first operative curved position to a second flattened position that may be considered to be inoperative.

Figure 20:
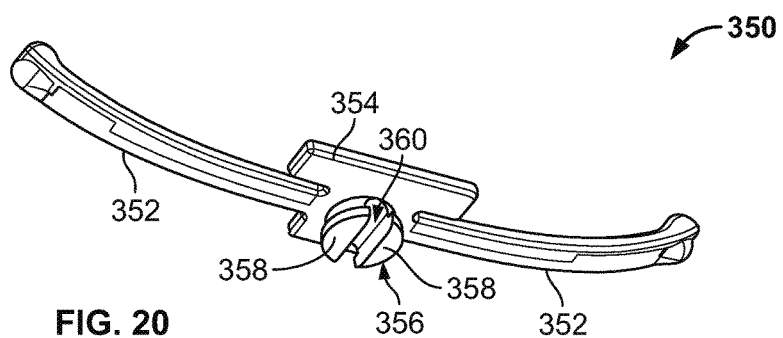
FIG. 20 is a bottom perspective view of the flexible member for an adjustable pan lid of FIG. 18.

FIG. 20 depicts a bottom perspective view of the flexible member 350. A flexible connecting member 356 protrudes from the bottom of the base 354 of the flexible member for connecting the flexible member to the rotating locking members 312 of an adjustable pan lid. Connecting member 356 fits within a hole (not shown) of the clasp leg 314b to connect the flexible member to the clasp 314. More specifically, the connecting member 356 has two posts 358 with a gap 360 disposed between the two posts 358. Posts 358 can be compressed towards each other to snap the connecting member 356 through the hole (not shown) at the bottom of the clasp leg 314b.

As described above, when the clasp 314 is in an open position, main body 314a is generally horizontal and parallel to the top surface of the pan lid and leg 314b is vertical and perpendicular to the top surface of the bakeware pan. When clasp 314 rotates to a closed position, main body 314a is generally vertical and perpendicular to the top surface of the pan lid and leg 314b is horizontal and parallel to the top surface of the pan lid, and is disposed under rotating locking member 312. In this closed position, the clasp leg 314b is rotated so that leg 314b and flexible member 350 are rotated under the bottom of the adjustable pan lid. The main body 314a of clasp 314 is now perpendicular to the top of the adjustable pan lid. The clasp leg 314b has two openings 362 that the flexible fingers can fit inside of if the flexible fingers are flattened to a fully extended position towards the surface 364 of the clasp leg 314b.

The flexible fingers 352 of the flexible member 350 allow for the same pan lid to be locked to two different sized pans. Each of the flexible fingers 352 is generally biased, for example by being formed of spring metal, to a first position where they are curved away from the inner surface 364 of the clasp leg 314b. In this position, flexible fingers 352 can be used to retain a narrower pan and assist in preventing lateral movement of the pan. For use with a different pan having wider edges, such that the locking member 312 does not require additional assistance to prevent lateral movement, flexible fingers 352 are pressed out of the way by the edge or lip of the pan, such that fingers 352 engage an outer surface of the outer lip of the underside of the pan when locking members 312 are in the locked position.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:

1. A lid adapted and configured to be releasably attachable to at least two food containers, wherein the at least two food containers are pans for use in cooking or baking, each of the food containers has a bottom and an opposite open top and an upstanding side extending between the bottom and the open top, each of the food containers has a lip extending outward from the upstanding side at the open top of the food container, the lip of a first of the at least two food containers has a different dimension of extension than the lip of a second of the at least two food containers, the lid comprising:

a first side and a second side connected to the first side by a first end and a second end;

a first clasp rotatably disposed on the first side and a second clasp rotatably disposed on the second side, wherein the first clasp and the second clasp are each capable of being rotated from an open position to a closed position, and a pair of adaptors removably connectable to the respective first and second clasp, each adaptor having a first surface and an opposite second surface, each adaptor being capable of being removably connected to one of the first clasp or the second clasp in a first orientation and a second orientation, wherein when in the first orientation, the adaptor first surface is oriented toward and capable of engaging the lip of the first food container and the adaptor second surface is oriented away from the lip of the first food container, and wherein when in the second orientation, the adaptor second surface is oriented toward and capable of engaging the lip of the second food container and the adapter first surface is oriented away from the lip of the second food container.

2. The lid of claim 1, wherein each adaptor comprises an open side disposed between the first surface and the second surface, and each adaptor is removably connectable to the first clasp or the second clasp through its respective open side.

3. The lid of claim 1, wherein the first surface of each of the pair of adaptors is generally flat.

4. The lid of claim 3, wherein the second surface of each of the pair of adaptors has at least one ridge protruding from the second surface.

5. The lid of claim 4, wherein when the first clasp and the second clasp are both in the closed position, and the pair of adaptors are both in the second orientation, the at least one ridge of each of the pair of adaptors engages the lip of the second food container.

6. The lid of claim 1, wherein:

the first clasp is configured to close onto a first slider stop disposed on the first side such that a first slider translates horizontally over the first clasp and the first slider stop to lock the first clasp in position; and the second clasp is configured to close onto a second slider stop disposed on the second side such that a second slider translates horizontally over the second clasp and the second slider stop to lock the second clasp in position.

7. The lid of claim 1, wherein the second surface of each of the adaptors is wider than the first surface.

8. The lid of claim 1, wherein each of the adaptors comprises a third surface extending between the first surface and the second surface, and the third surface includes indicia to indicate a preferred orientation of each of the adaptors for each of the food containers.

9. A lid capable of being used with at least a first food container having a first external dimension and a second food container having a second external dimension that is wider than the first external dimension, the lid comprising:
 a first side and a second side connected to the first side by a first end and a second end; and
 a first connecting mechanism disposed on the first side and a second connecting mechanism disposed on the second side, wherein each connecting mechanism has a container engagement portion that is removably attachable to the respective connecting mechanism in a first orientation to engage the first food container and retain the lid thereto, and a second orientation to engage the second food container and retain the lid thereto;
 wherein each connecting mechanism container engagement portion comprises a first surface and an opposite second surface, and wherein when the container engagement portion is in the first orientation, the first surface of the container engagement portion is in a first operative position to engage the first food container and the second surface of the container engagement portion is arranged on the connecting mechanism to be non-engageable with the first food container, and wherein when the container engagement portion is in the second orientation, the second surface of the container engagement portion is in a second operative position to engage the second food container and the first surface of the container engagement portion is arranged on the connecting mechanism to be non-engageable with the second food container.

10. The lid of claim 9, further comprising a pair of securing mechanisms on the first side and the second side of the lid, the pair of securing mechanisms each being capable of being rotated from an open position to a closed position.

11. The lid of claim 10, wherein for each of the connecting mechanism container engagement portions, the first surface is a ridged surface and the second surface is a generally flat surface, and when each of the connecting mechanisms is in the first orientation, the ridged surface of each of the adaptors is engaged with the first food container, and when each of the connecting mechanisms is in the second orientation, the generally flat surface of each of the adaptors is engaged with the second food container.

12. The lid of claim 11, wherein the ridged surface of each container engagement portion of the connecting mechanisms is wider than the generally flat surface.

13. The lid of claim 11, wherein each of the container engagement portions of the connecting mechanisms includes a middle joining surface between the generally flat surface and the ridged surface, the middle joining surface including indicia to indicate a preferred orientation of each of the connecting mechanisms for each of the food containers.

14. The lid of claim 11, wherein each of the container engagement portions of the connecting mechanisms includes an open side between the generally flat surface and the ridged surface, the open side of each of the container engagement portions of the connecting mechanisms being connectable to one of the pair of securing mechanisms.

* * * * *